(12) United States Patent
Jatzke et al.

(10) Patent No.: US 11,807,073 B2
(45) Date of Patent: Nov. 7, 2023

(54) VENTING VALVE

(71) Applicant: ILLINOIS TOOL WORKS INC., Glenview, IL (US)

(72) Inventors: Stefan Jatzke, Ebertsheim (DE); Hubert Loewe, Weselberg (DE)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 222 days.

(21) Appl. No.: 16/963,413

(22) PCT Filed: Oct. 23, 2018

(86) PCT No.: PCT/US2018/056969
§ 371 (c)(1),
(2) Date: Jul. 20, 2020

(87) PCT Pub. No.: WO2019/147314
PCT Pub. Date: Aug. 1, 2019

(65) Prior Publication Data
US 2020/0338962 A1    Oct. 29, 2020

(30) Foreign Application Priority Data

Jan. 23, 2018    (DE) .................... 10 2018 101 406.6

(51) Int. Cl.
*B60H 1/26* (2006.01)
*F24F 13/14* (2006.01)
*B60H 1/24* (2006.01)

(52) U.S. Cl.
CPC .............. *B60H 1/26* (2013.01); *B60H 1/249* (2013.01); *F24F 13/1486* (2013.01)

(58) Field of Classification Search
CPC ......... B60H 1/26; B60H 1/249; F16K 15/035; F16K 24/04; F24F 13/14; F24F 13/1486
See application file for complete search history.

(56) References Cited

U.S. PATENT DOCUMENTS 1,451,586 A * 4/1923 Olson ................. F24F 13/1426
49/53
5,727,999 A    3/1998 Lewis
(Continued)

FOREIGN PATENT DOCUMENTS

CN    107206867 A *  9/2017  ............ B60H 1/249
DE    102017127563    5/2019
(Continued)

OTHER PUBLICATIONS

PCT, International Search Report and Written Opinion of the International Searching Authority, International Application No. PCT/US2018/056969; dated Jan. 25, 2019, 9 pages.

*Primary Examiner* — Jessica Yuen
(74) *Attorney, Agent, or Firm* — THOMPSON HINE LLP (57) ABSTRACT

A venting valve for venting the interior of a vehicle includes a housing having at least one passage opening, and at least one venting flap which is mounted on the housing by a pivot mounting so as to be pivotable between a closed position and an open position. In the closed position, the at least one venting flap closes off the at least one passage opening and, in the open position, opens up the at least one passage opening for an air stream from the interior of the vehicle to the outside. The pivot mounting is arranged on an inner side of the housing, which inner side, in the assembled or installed state, faces the interior of the vehicle.

13 Claims, 10 Drawing Sheets (56) References Cited

U.S. PATENT DOCUMENTS

| | | | |
|---|---|---|---|
| 6,475,078 B1 | 11/2002 | Borcherding | |
| 2005/0199845 A1* | 9/2005 | Jones | F16K 15/035 |
| | | | 251/129.06 |
| 2015/0283882 A1 | 10/2015 | Juroszek | |
| 2017/0320377 A1 | 9/2017 | Huët | |
| 2019/0152296 A1 | 5/2019 | Lefever | |

FOREIGN PATENT DOCUMENTS

| | | | |
|---|---|---|---|
| DE | 112013003642 | 8/2019 | |
| EP | 0861748 B1 | 9/1998 | |
| EP | 1630486 A2 * | 3/2006 | B60H 1/00678 |
| EP | 2527172 A1 | 11/2012 | |
| FR | 3028455 | 5/2016 | |
| GB | 368429 A * | 3/1932 | |
| WO | WO-2008068565 A1 * | 6/2008 | B60H 1/249 |

\* cited by examiner

VENTING VALVE

TECHNICAL FIELD

The invention relates to a venting valve for venting the interior of a vehicle, comprising a housing having at least one passage opening, and comprising at least one venting flap which is mounted on the housing by means of a pivot mounting so as to be pivotable between a closed and an open position, wherein, in the closed position, the at least one venting flap closes off the at least one passage opening and, in the open position, opens up the at least one passage opening for an air stream from the interior of the vehicle to the outside.

BACKGROUND

Venting valves of the above-mentioned type serve for removing outgoing air from the interior of a vehicle in the event of a positive pressure occurring in the vehicle interior in relation to the vehicle surroundings. For example, air supplied to the vehicle interior via a ventilation system can thus be removed. A positive pressure suddenly occurring in the vehicle interior—produced, for example, by closing of a vehicle door or by the triggering of an airbag—can also be compensated for by the excess air passing to the outside from the vehicle interior through the venting valve. If the pressure in the vehicle interior does not exceed or only slightly exceeds the external pressure, the venting flap lies against the housing and therefore closes off the valve. It is intended thereby to prevent impurities, such as, for example, vehicle exhaust gases, moisture and noise passing into the inside of the vehicle. Venting valves are customarily arranged in the rear region of the vehicle in order to permit a flow through the entire vehicle of fresh air which is supplied by the ventilation system arranged in the front of the vehicle. In particular, venting valves are arranged in the vicinity of the rear wheels of the vehicle for visual reasons since they can thus be concealed in a simple manner by the rear skirt.

DE 11 2013 003 642 T5 discloses a venting valve, in which a compensating weight is provided which compensates for the weight of the venting flap and pivots in a compensating-weight recess space when the venting flap is moving into the open position. A further venting valve is known from EP 0 861 748 B 1.

In the German patent application with the official application number 10 2017 127 563.0, which is attributed to this applicant and has not yet been published, a venting valve for a vehicle is described, in which restoring means are provided for the pivoting back of a venting flap from the open position into the closed position. The venting flap can be mounted pivotably on a valve frame in such a manner that, in a fitted state of the venting valve in a vehicle, said venting flap opens in the direction of gravity and closes counter to the direction of gravity.

It is known to mount venting flaps of venting valves of this type on the housing so as to be pivotable between the closed position and the open position. This leads to a simple and basically robust design. However, due to the described arrangement of the venting valves in the rear region of the vehicle where said venting valves are exposed to considerable impurities from the outside, soiling and therefore malfunctions of the pivot mounting and thereby of the venting valve may occur.

SUMMARY

Starting from the explained prior art, the invention is based on the object of providing a venting valve of the type mentioned at the beginning which reliably carries out its venting function at all times while having a simple design.

The invention achieves the object by the subject matter of independent claim 1. Advantageous refinements are found in the dependent claims, the description and the figures.

For a venting valve of the type mentioned at the beginning, the invention achieves the object in that the pivot mounting is arranged on an inner side of the housing, which inner side, in the assembled state, faces the interior of the vehicle.

As explained at the beginning, the venting valve serves for letting air out of a vehicle interior, in particular in the event of a positive pressure prevailing in the vehicle interior in comparison to the vehicle surroundings. The venting valve can be accommodated via the housing, for example in a body opening of a vehicle, such as a passenger vehicle or truck. The housing can also be connected to a mounting plate which is connected in turn to the body of the vehicle. The venting valve has one or more passage openings which can be closed off or opened up by a respective venting flap. For this purpose, the at least one venting flap is mounted pivotably on the housing by means of a pivot mounting. In the closed position, the at least one passage opening is closed off by the at least one venting flap against the passage of air or against the entry of impurities and noises from the outside. By contrast, in the open position, the at least one venting flap opens up the at least one passage opening, and therefore air can flow off out of the vehicle interior to the outside in the event of a corresponding positive pressure in the vehicle interior.

According to the invention, the pivot mounting for the at least one venting flap is located on an inner side of the housing, which inner side, in the assembled state of the venting valve, faces the interior of the vehicle. Since the at least one venting flap, as explained, preferably tightly closes off the passage opening to the outside in the closed position, the pivot mounting is reliably protected according to the invention against impurities and associated functional impairments. According to the invention, the arrangement of the pivot mounting is such that impurities or moisture from the outside cannot reach the pivot mounting or can reach same only in a considerably reduced manner in comparison to the prior art. By, according to the invention, the pivot point of the pivot mounting of the at least one venting flap being placed onto the inner side of the housing, which inner side faces away from the vehicle surroundings, reliable functioning of the pivot mounting and therefore a reliable venting function are thus ensured at all times. Functional impairments due to accumulations of dirt on the pivot joint or due to entry of moisture are minimized. At the same time, the venting valve according to the invention is of simple and robust design.

The at least one venting flap can be composed of a plastic. The same is true of the housing and components of the pivot mounting. For example, the at least one venting flap can be composed of (soft) EPDM (ethylene-propylene-diene rubber) or NBR (acrylonitrile-butadiene rubber) or TPE (thermoplastic elastomer) or another, even a hard, plastic. The at least one venting flap can be produced, for example, in a plastics injection molding method. The at least one venting flap can thereby be shaped in such a manner that, for example, fluttering in the air stream is minimized. As a result, the production of noise by the venting flap can also be minimized.

According to one refinement, the pivot mounting can comprise at least one pivot arm which is preferably connected fixedly to the at least one venting flap and is pivotably articulated on at least one pivot bearing arranged on the inner side of the housing. The pivot arm or pivot arms can likewise be composed of plastic. By means of such pivot arms, the at least one venting flap arranged on the outer side of the venting valve can be reliably connected to the pivot bearing.

The at least one pivot bearing can comprise at least one pivot projection, such as a pivot cylinder, and/or at least one pivot receptacle. For example, the at least one pivot projection can be in the form of one pivot pin or a plurality of pivot pins. The pivot arm can have one or more pivot receptacles, for example C-shaped pivot receptacles, which latch to the at least one pivot projection. Additionally or alternatively, a kinematic reversal is also conceivable, in which the pivot arm has at least one pivot projection which latches in at least one corresponding pivot receptacle of the pivot bearing. By means of such latching of the at least one pivot arm on the at least one pivot bearing, particularly simple mounting and a secure grip are possible.

According to a further refinement, at least in the open position of the at least one venting flap, the at least one pivot arm can extend through the at least one passage opening of the housing. In the closed position, the at least one passage opening is closed off by the at least one venting flap. The at least one pivot arm can extend through the passage opening in the open position and in particular also in optionally all intermediate positions between the closed position and the open position.

The at least one pivot arm can be curved in an arcuate manner. It can have, for example, a semicircular curvature. As a result, firstly, simple mounting and, secondly, safe pivoting of the at least one venting flap when the at least one pivot arm extends through the passage opening are realized without the risk of collision or of jamming.

According to a further refinement, it can be provided that, in the closed position of the at least one venting flap, the at least one pivot arm guides in the direction of at least one venting flap an air stream coming from the vehicle interior, and that, in the open position, the at least one pivot arm guides in the direction of at least one passage opening of the housing an air stream coming from the vehicle interior. The at least one pivot arm is therefore aerodynamically active. It acts as an air-guiding element and, in the closed position, assists an opening of at least one venting flap by guiding the air stream onto said venting flap. Said venting flap can be the venting flap which is in each case supported by the pivot arm. However, it can also be, for example, an adjacent venting flap. In the open position, the pivot arm assists the flowing away of the air coming from the vehicle interior by being guided in the direction of at least one passage opening of the housing. The passage opening can be the passage opening which, in the closed position, is closed off by the venting flap supported by the pivot arm. However, it may also in turn be, for example, an adjacent passage opening. In cross section, the aerodynamically active part of the at least one pivot arm can have, for example, a V shape, wherein the point of the V shape points away from the outer side of the venting valve.

According to a further refinement, at least in the open position of the at least one venting flap, the at least one pivot arm can butt against at least one stop surface. The stop defines a maximum opening position of the respective venting flap. No other stop surfaces are then required for this purpose. The loading of the venting flap can also be minimized. The at least one pivot arm can also butt against at least one stop surface in the closed position. As a result, the closed position is also defined. This stop can assist the venting flap butting against an edge of the passage opening.

The at least one pivot arm can be connected integrally to the at least one venting flap. The production can take place, for example, in a plastics injection molding method. Alternatively, it is possible for the at least one pivot arm to be connected to the at least one venting flap by means of a detent connection. For example, the pivot arm can have one or more detent projections, for example detent lugs, which are accommodated in (a) corresponding detent receptacle(s) of the venting flap in a latching manner. By venting flap and pivot arm being formed separately, they can be adapted in respect of the selection of material to the respective requirements in a simple and specific manner. On the other hand, an integral design of pivot arm and venting flap is particularly simple in terms of production and mounting.

The at least one venting flap can be composed of a softer material than the at least one pivot arm. The at least one venting flap can also have a flap body and a sealing edge surrounding the flap body, wherein the flap body has greater rigidity than the sealing edge. In the closed position, the sealing edge lies against that edge of the housing which bounds the passage opening and thus particularly effectively seals off the passage opening. The at least one venting flap can be produced in a two-component injection molding method. The flap body can be produced from a harder material here than the sealing edge. However, it would also be conceivable for the at least one venting flap to be produced in a single-component injection molding method, with the sealing edge having a smaller material thickness than the flap body, and/or with the sealing edge having a geometrical shape which reduces the rigidity. Even in the case of an integral configuration of pivot arm and of venting flap, the venting flap can be produced from a different material, in particular a softer material, than the pivot arm. This can be realized in terms of production, for example, by means of a two-component injection molding method. By means of suitable selection of material for the venting flap, in particular from a soft material, noises within the course of closing of the venting flaps can be minimized.

According to a further refinement, restoring means can be provided for the pivoting back of the at least one venting flap from the open position into the closed position. The restoring means move the at least one venting flap back into the closed position when the air pressure between vehicle interior and vehicle surroundings is equalized. They can assist a restoring action of gravity. However, in principle, they also permit arrangements of the at least one venting flap in which restoring by means of gravity would not take place, for example an arrangement in which the venting flap opens in the direction of gravity in the assembled state. For this purpose, the restoring means can be designed to pivot the at least one venting flap back into the closed position without elastic deformation. Hard, substantially non-flexible plastics are therefore possible for the venting flap. Alternatively, venting flaps are also conceivable which, in addition to the pivoting movement, are elastically deformed during the opening.

The restoring means can comprise a counterweight for the gravity-induced pivoting back of the at least one venting flap into the closed position. The counterweight can be formed in a structurally particularly simple manner by a portion of the at least one pivot arm.

Alternatively or additionally, the restoring means can comprise at least one spring for the spring-force-induced pivoting back of the at least one venting flap into the closed position. Suitable springs are, for example, leg springs, in particular double leg springs. They can be connected with one leg to the pivot arm and with the other leg to the housing. During the opening of the venting flap, the leg spring is deformed, in particular twisted, counter to its prestress. As a result, the leg spring moves the pivot arm and, together therewith, the venting flap, back into the closed position with reverse deformation after the air stream of the vehicle interior has lessened.

According to a further refinement, it can be provided that the at least one venting flap is furthermore assigned at least one counterweight, wherein the at least one counterweight is arranged in such a manner that a common center of gravity of the at least one venting flap and of the at least one counterweight assigned to the at least one venting flap lies in the pivot axis of the at least one venting flap. In this refinement, in addition to a spring pivoting the at least one venting flap back into the closed position, the at least one venting flap is assigned at least one counterweight which is designed and arranged in such a manner that the center of gravity of the structure consisting of venting flap and counterweight coincides with the pivot axis of the venting flap. By means of this arrangement, the torque produced by the venting flap and the torque produced by the counterweight are always balanced out. The overall arrangement of venting flap and counterweight is therefore free from torque, except for a torque exerted by the spring, in every pivot position of the venting flap. This applies independently of the mounting alignment of the venting valve according to the invention, in particular independently of the spatial orientation of the pivot axis and the opening direction of the venting flap. The closing force for pivoting of the venting flap back into the closed position is generated exclusively by the spring. According to this refinement, the venting valve is therefore independent of gravity and can be mounted in any desired spatial orientation. The required closing force is low, and therefore springs of correspondingly small dimensions can be used. In addition, the closing speed of the venting flap is advantageously always the same. If a plurality of venting flaps are provided, each venting flap can in each case be assigned a counterweight, and therefore the entire center of gravity of the respective venting flap and of the counterweight assigned in each case thereto lies in the pivot axis of the respective venting flap. Furthermore, in this case, each venting flap can in each case be assigned a spring for pivoting said flap back into the closed position.

The invention also relates to a vehicle having a venting valve according to the invention mounted thereon. In the fitted state, the pivot axis of the at least one venting flap can basically run horizontally or else vertically. The at least one venting flap can furthermore be mounted pivotably on the housing in such a manner that, in a fitted state of the venting valve in the vehicle, the at least one venting flap opens in the direction of gravity and closes counter to the direction of gravity. However, other arrangements are also possible, in which, in a fitted state, the at least one venting flap opens, for example, counter to the direction of gravity and closes in the direction of gravity.

BRIEF DESCRIPTION OF THE DRAWINGS

Exemplary embodiments of the invention are explained in more detail below with reference to figures, in which, schematically.

DETAILED DESCRIPTION

Unless stated otherwise, identical reference signs denote identical objects in the figures.

Figures 1, 2, 3:
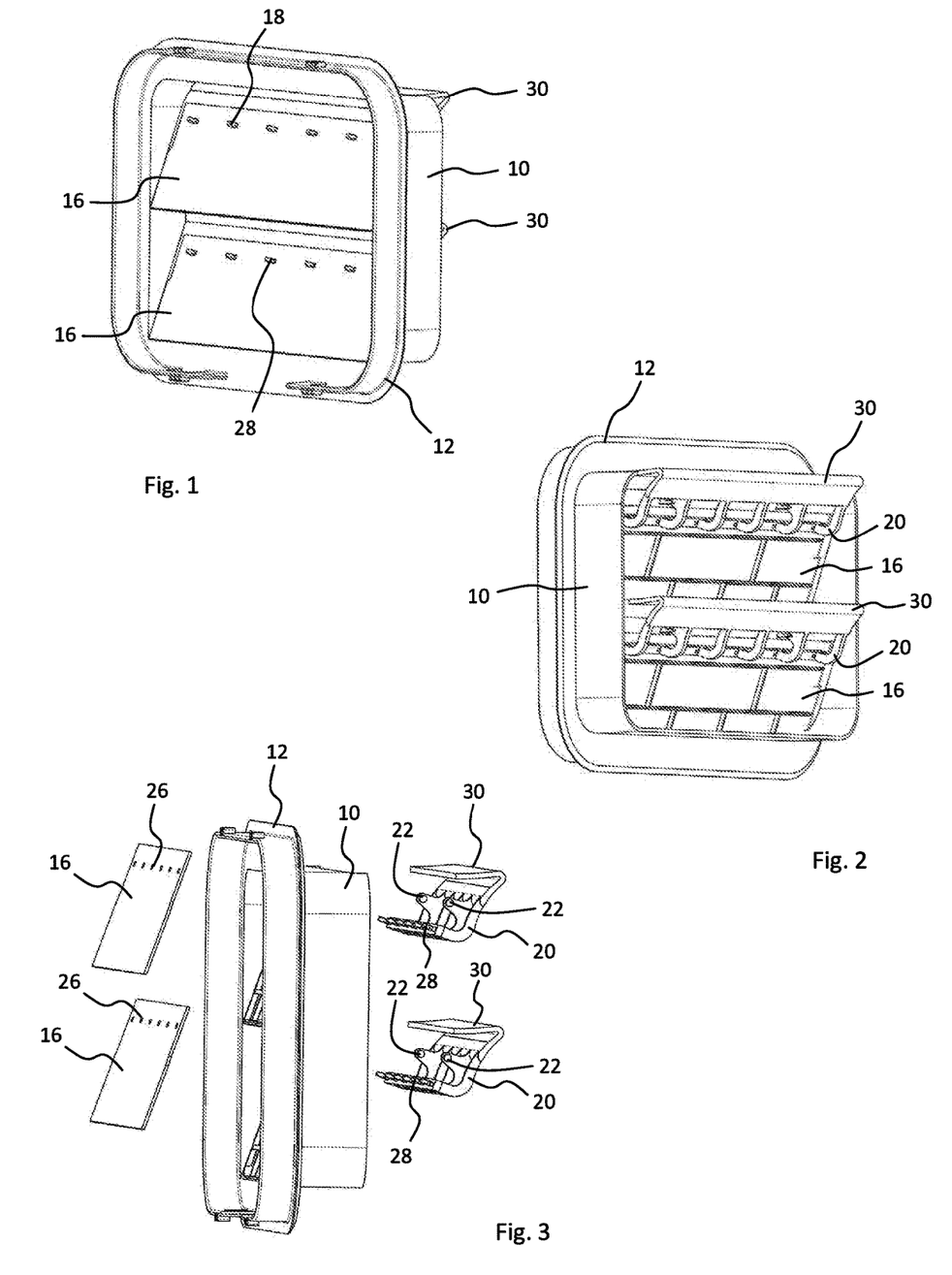
FIG. 1 shows a first exemplary embodiment of a venting valve according to the invention in a perspective view from the outside.
FIG. 2 shows the venting valve from FIG. 1 in a perspective view from the inside.
FIG. 3 shows the venting valve, which is shown in FIG. 1, in a perspective exploded illustration.

The venting valve shown in FIGS. 1 to 3 has a housing 10 which can be fastened with a housing projection 12 (sealing frame), for example in a body opening of a vehicle, such as a passenger car or truck. In the example shown, the housing 10 forms two passage openings 14 (see FIGS. 8 and 9) which, in the operating state shown in FIGS. 1 and 2, are closed off by a respective venting flap 16 in the closed position shown. As can be seen in particular in FIGS. 7 to 9, the venting flaps 16 are mounted on the housing 10 so as to be pivotable between a closed position shown in FIG. 7 and an open position shown in FIG. 9. In the open position, the venting flaps 16 open up the passage openings 14 for an air stream 18 coming out of the vehicle interior.

Figure 4:
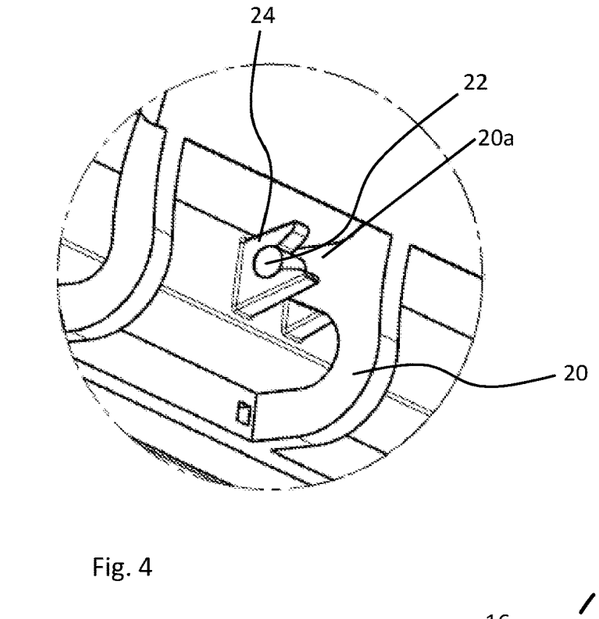
FIG. 4 shows an enlarged detail of the venting valve, which is shown in FIG. 1, in a perspective view.
Figure 5:
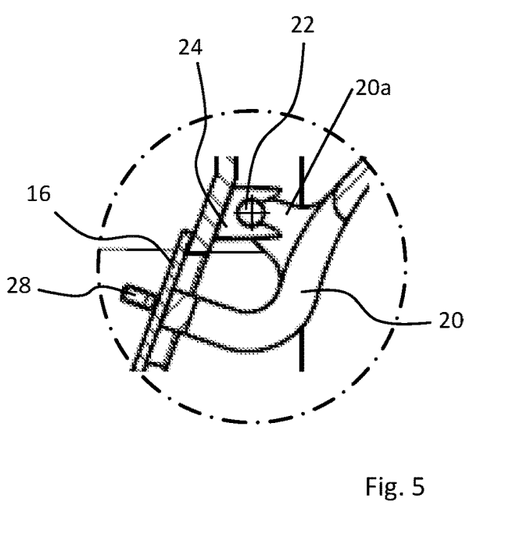
FIG. 5 shows a sectional view through the detail shown in FIG. 4.

In the example shown, each venting flap 16 is mounted pivotably on the housing 10 by means of a pivot arm 20. For this purpose, in the example shown, the pivot arms 20 each have two pivot pins 22 located on pivot tabs 20a that extend from central portions of the pivot arms 20, which pivot pins are received in a latching manner in corresponding pivot receptacles 24 of the housing 10, as can be readily seen in particular in the enlarged illustrations of FIGS. 4 and 5. The pivot receptacles 24 forming the pivot mounting are arranged on the inner side of the housing 10, which inner side, in the fitted state, faces away from the vehicle surroundings, as can readily be seen in particular in FIGS. 4, 5 and 7 to 9. As can furthermore be seen in FIG. 7, the pivot mounting formed by the pivot receptacles 24 in conjunction with the pivot pins 22 is therefore effectively protected from impurities or moisture located in the vehicle surroundings.

Figure 6:
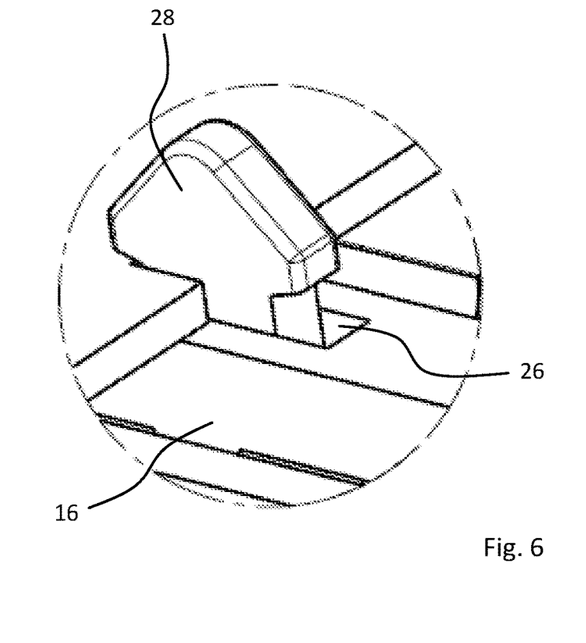
FIG. 6 shows a further enlarged detail of the venting valve, which is shown in FIG. 1, in a perspective view.

The venting flaps 16 each have a plurality of detent receptacles 26 and the pivot arms 20 have corresponding detent projections 28. In the assembled state, the detent projections 28, which are of arrow-shaped design in the example illustrated, engage in the detent receptacles 26 in a latching manner, as can be seen in the enlarged illustration of FIG. 6. The venting flaps 16 are thereby in each case fastened to the pivot arms 20.

Figure 7:
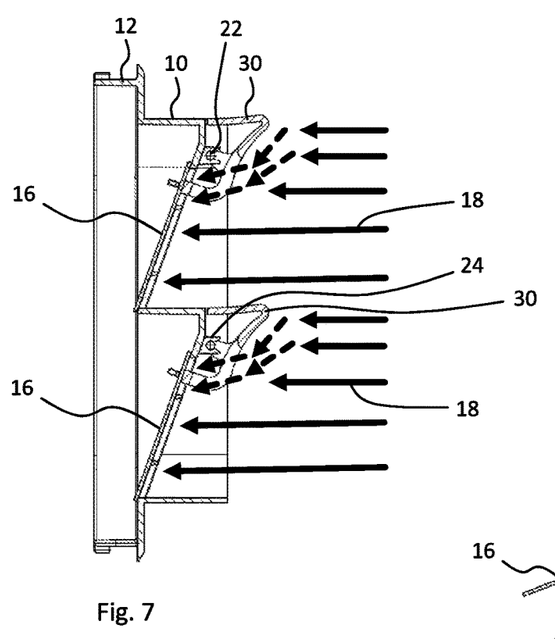
FIG. 7 shows a sectional view of the venting valve, which is shown in FIG. 1, in a first operating state.
Figure 8:
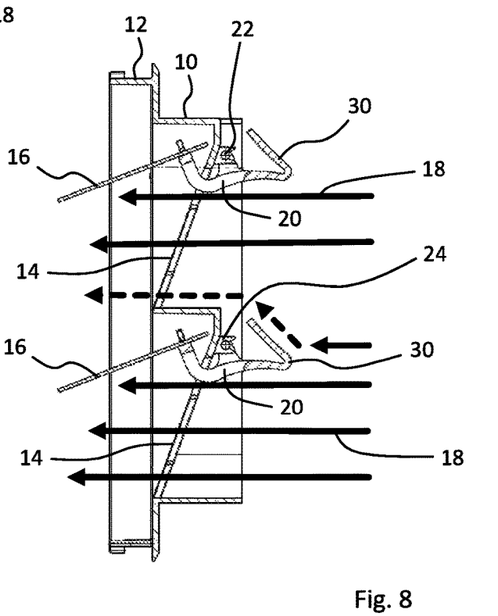
FIG. 8 shows the illustration from FIG. 7 in a second operating state.
Figure 9:
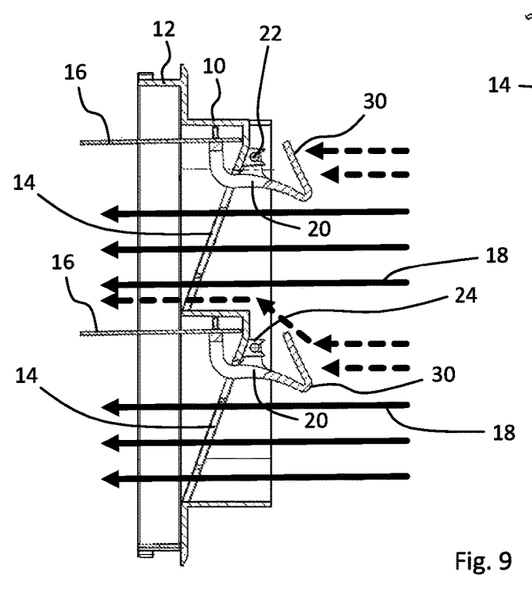
FIG. 9 shows the illustration from FIG. 7 in a third operating state.

FIG. 7 shows an operating state in which an internal pressure from the vehicle interior impinges against the venting flaps 16, which are still closed. FIG. 8 shows an operating state in which the venting flaps 16 are partially opened by the internal pressure. FIG. 9 shows an operating state in which the venting flaps 16 are completely opened by the internal pressure. It can also be seen in FIGS. 8 and 9 that, in the open position, which is shown in FIG. 9, of the venting flaps 16 and also in intermediate positions, as shown in FIG. 8, the pivot arms 20 which are curved in an arcuate manner extend through the respective passage opening 14. The pivot arms 20 also each have a V-shaped portion 30 at their ends facing away from the venting flaps 16. The V-shaped portions 30 serve to direct the air flow, as shown in FIGS. 7 to 9. It can be seen here that, in the closed position of the venting flaps 16, the V-shaped portions 30 of the pivot arms 20 guide in the direction of the venting flap 16, which is in each case supported by the pivot arms 20, an air stream coming from the vehicle interior, as illustrated in FIG. 7 by the dashed arrows. In the intermediate position shown in FIG. 8 and in the open position shown in FIG. 9, the V-shaped portions 30 by contrast guide the air stream coming from the vehicle interior in the direction of the adjacent passage opening 14 as illustrated in turn by the dashed arrows in FIGS. 8 and 9. The pivot arms 20 thereby assist the removal of outgoing air from the vehicle interior.

In the exemplary embodiment shown in FIGS. 1 to 9, the venting flaps 16 in the assembled state can be restored from the open position into the closed position, for example solely by the action of gravity, as soon as the air pressures in the vehicle interior and in the vehicle surroundings have been equalized. However, a portion of the pivot arms 20 can also act as a counterweight which assists the restoring of the venting flaps 16 into the closed position. Since, in this exemplary embodiment, the venting flaps 16 are also formed separately from the pivot arms 20, there is the greatest possible freedom in respect of the selection of material for the venting flaps 16. Depending on the application, hard or soft plastics can therefore be selected. By contrast, the pivot arms 20 can be formed from a hard plastic. The housing 10 can also be formed from a hard plastic.

Figure 10:
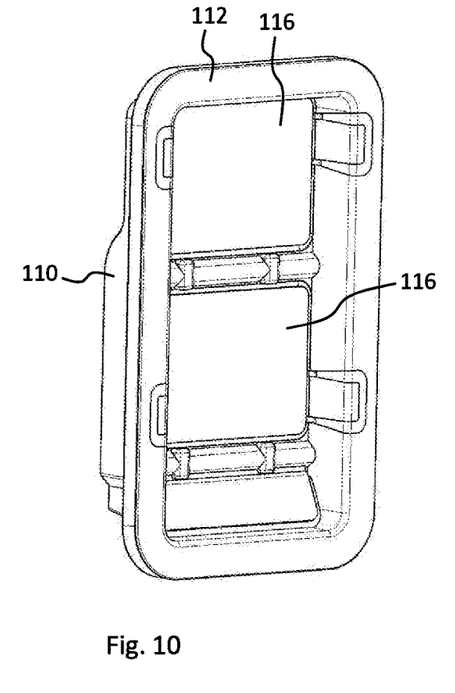
FIG. 10 shows a further exemplary embodiment of a venting valve according to the invention in a perspective view from the outside.
Figure 11:
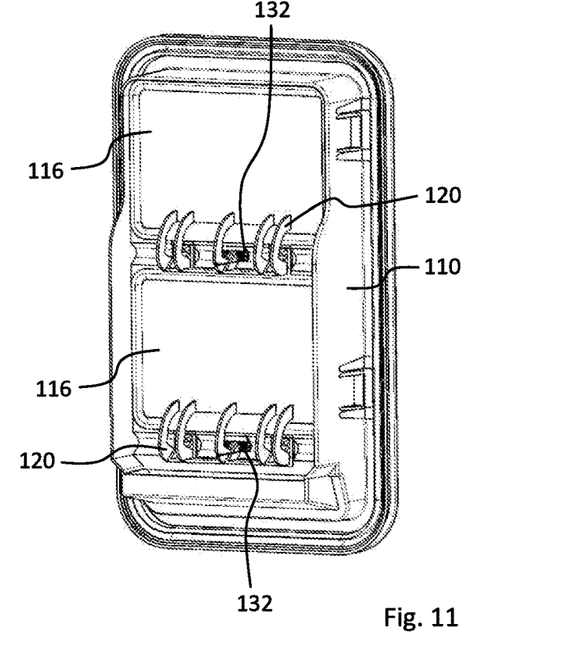
FIG. 11 shows the venting valve from FIG. 10 in a perspective view from the inside.
Figure 12:
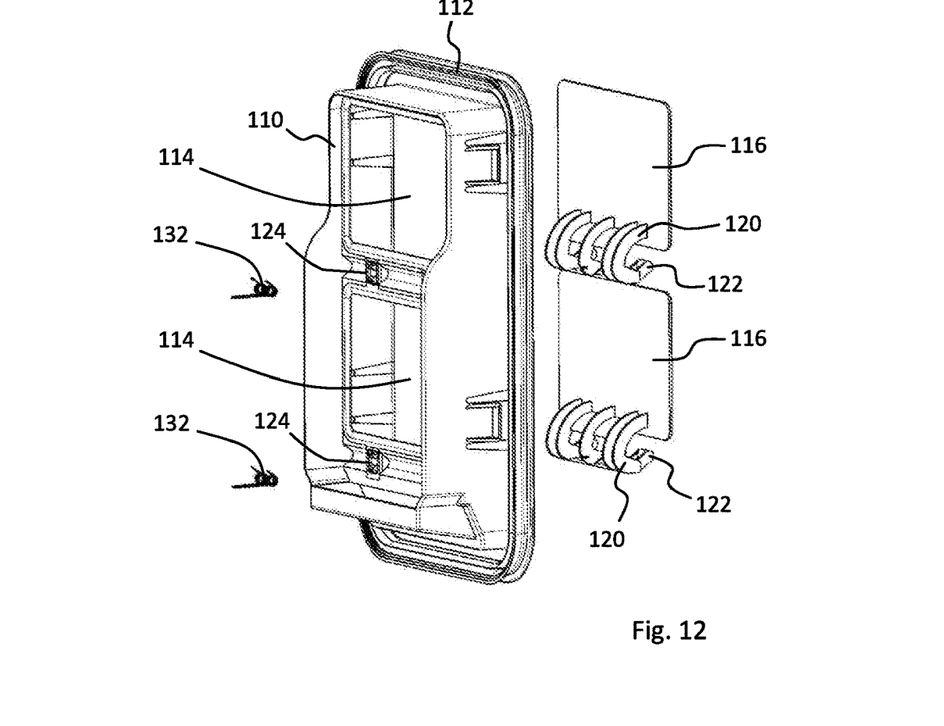
FIG. 12 shows the venting valve from FIG. 10 in a perspective exploded illustration.
Figure 13:
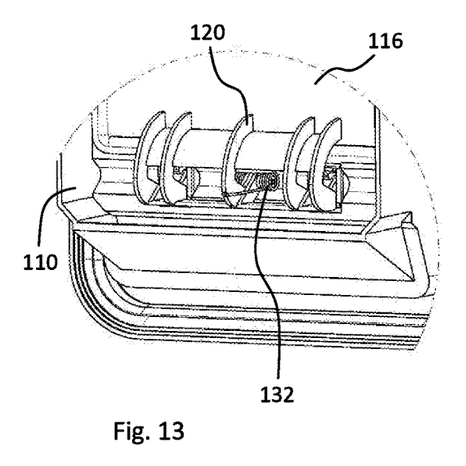
FIG. 13 shows an enlarged perspective illustration of a detail of the venting valve, which is shown in FIG. 10, in a first operating state.
Figure 14:
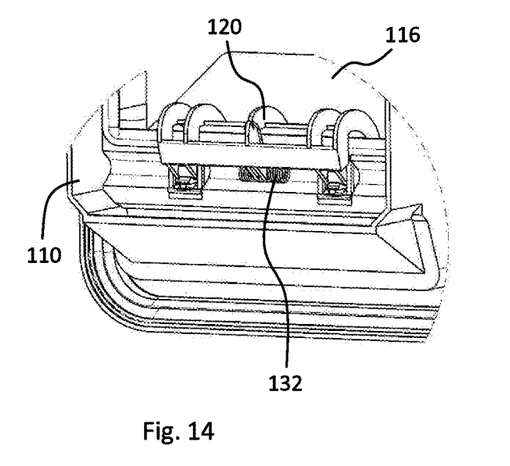
FIG. 14 shows the illustration from FIG. 13 in a second operating state.

A further exemplary embodiment will be explained with reference to FIGS. 10 to 19. This venting valve substantially corresponds in respect of configuration and function to the venting valve explained with reference to FIGS. 1 to 9. It likewise has a housing 110 which is of rectangular design in this case. It can be inserted in turn with a housing projection 112 into a corresponding mounting opening in a vehicle. This housing 110 also defines two passage openings 114 which, in a closed position shown in FIGS. 10 and 11, are closed off by a respective venting flap 116.

Unlike in the exemplary embodiment of FIGS. 1 to 9, in the exemplary embodiment of FIGS. 10 to 19 a pivot arm 120 is in each case integrally connected to the venting flaps 116. The pivot arms 120 each have two pivot cylinders 122. On the inner side of the housing 110, two corresponding pivot receptacles 124 are formed for each pivot arm 120 and the pivot cylinders 122 of the pivot arms 120 engage therein in a latching manner in the assembled state (see FIGS. 11 and 12). This can also be readily seen in the enlarged illustrations of FIGS. 17, 18 and 19. In addition, in the example shown, two double leg springs 132 are provided which, in the assembled state, are each fastened at one end to a respective pivot arm 120 and are each fastened at the other end to the housing 110. This can be seen in particular in the enlarged illustration of FIG. 13. In the operating state shown in FIG. 13, the venting flaps 116 are closed. If the venting flaps 116 are pivoted up from the closed position shown in FIGS. 10, 11 and 13 into the open positon shown in FIG. 14, the double leg springs 132 are twisted counter to their prestress. As a result, when the air pressure between the vehicle interior and vehicle surroundings is equalized, the double leg springs 132 move the venting flaps 116 out of the open position back into the closed position. Cylindrical projections 134 which, in the assembled state, are surrounded by the double leg springs 132 can furthermore be seen in FIG. 17. A receptacle for holding one leg end of the respective double leg spring 132 can also be seen in FIG. 17 at reference sign 136.

Figure 15:
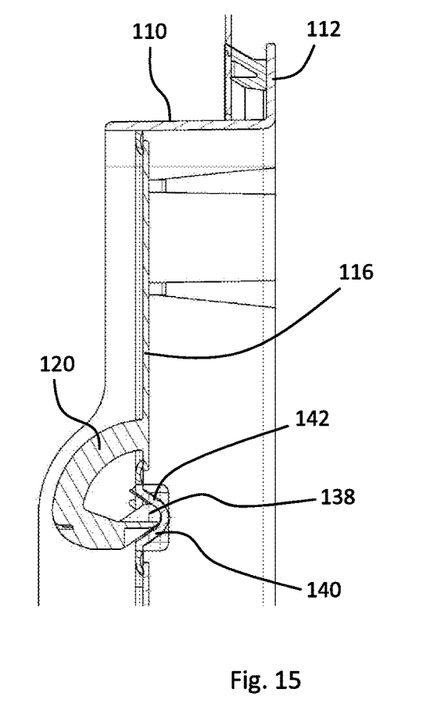
FIG. 15 shows a partial sectional illustration of the venting valve, which is shown in FIG. 10, in the operating state shown in FIG. 13.
Figure 16:
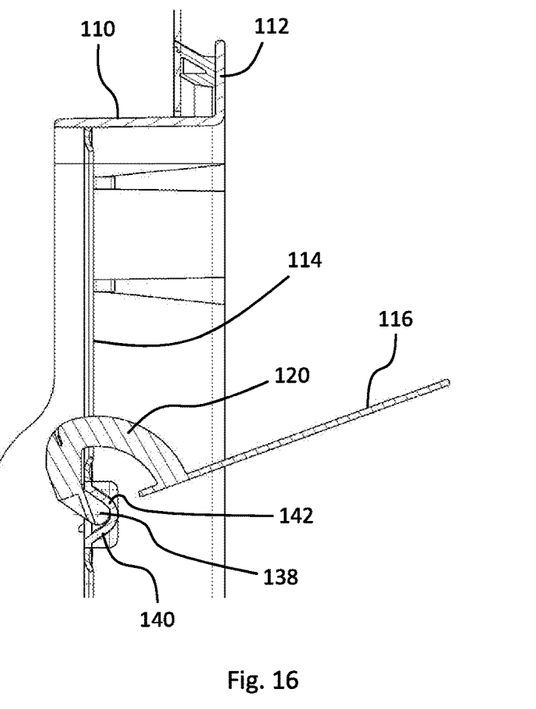
FIG. 16 shows the illustration from FIG. 15 in the operating state shown in FIG. 14.
Figure 17:
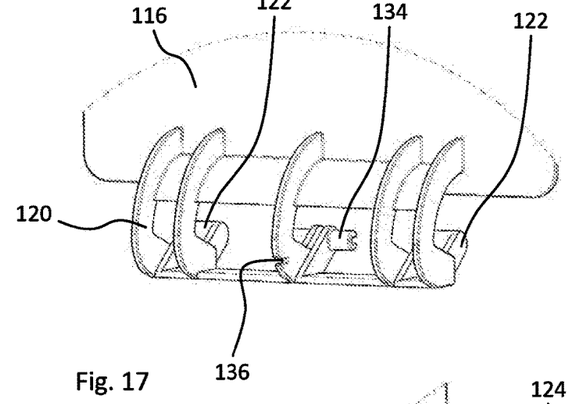
FIG. 17 shows an enlarged perspective illustration of part of the venting valve shown in FIG. 10.
Figure 18:
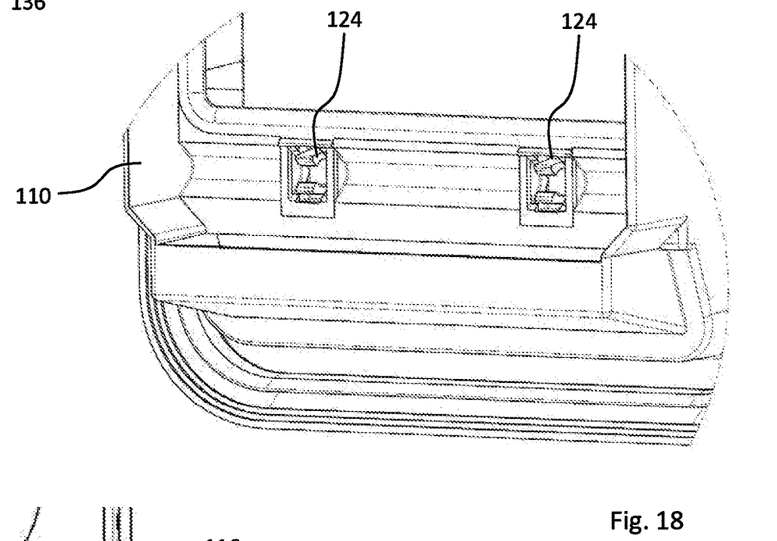
FIG. 18 shows a further enlarged perspective illustration of part of the venting valve shown in FIG. 10.
Figure 19:
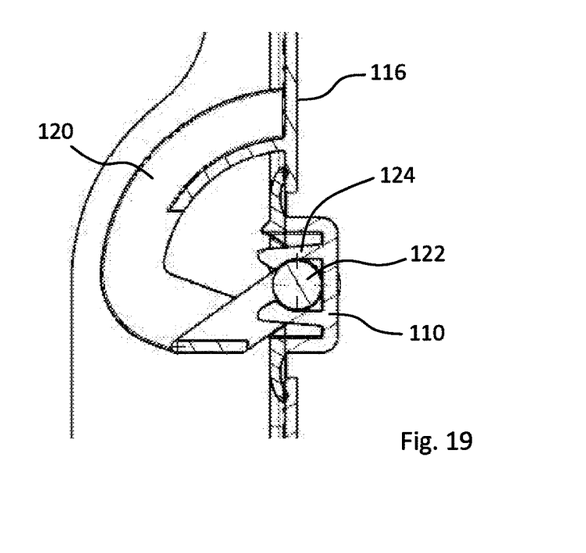
FIG. 19 shows a further sectional view of part of the venting valve shown in FIG. 10.

In the enlarged sectional illustrations of FIGS. 15 and 16, the kinematics during the opening and closing of the venting valves 116 can be seen. It can thus firstly be seen that, in the open position, which is shown in FIG. 16, and in possible intermediate positions between the open position and the closed position, which is shown in FIG. 15, of the venting flap 116, the pivot arm 120 which is in turn arcuately curved also extends through the passage opening 114. In addition, it can be seen that, in the closed position which can be seen in FIG. 15 and in the open position which can be seen in FIG. 16, the pivot arm 120 with its bearing portion 138 forming the pivot cylinder 122 butts against a respective stop surface 140, 142 of the housing 110. The maximum position of the venting flap 116 can thereby be predetermined or adapted in a desired manner.

Figure 20:
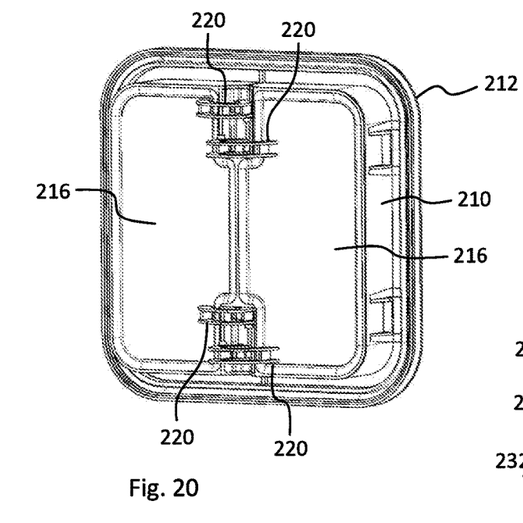
FIG. 20 shows a further exemplary embodiment of a venting valve according to the invention in a perspective view from the inside.
Figure 21:
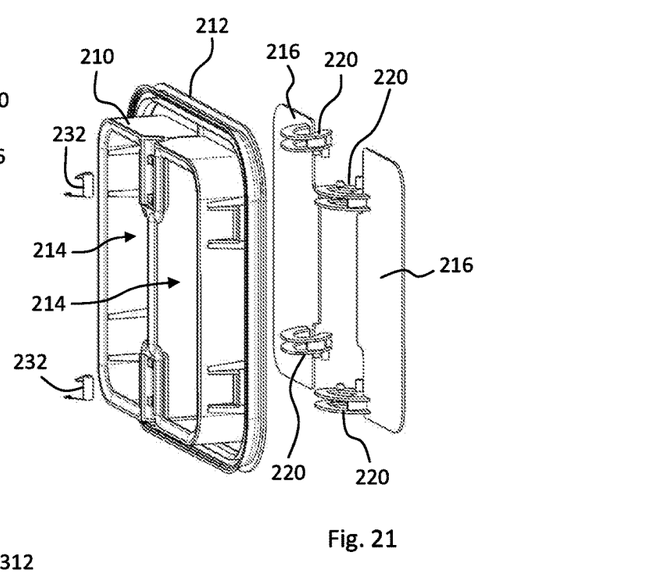
FIG. 21 shows an exploded illustration of the venting valve shown in FIG. 20.

FIGS. 20 and 21 show a further exemplary embodiment of a venting valve according to the invention which in turn substantially corresponds in respect of function and configuration to the venting valve shown in FIGS. 10 to 19. In this exemplary embodiment, a housing 210 is again provided, with a housing projection 212 for arranging in a corresponding mounting opening of a vehicle. The housing 210 again defines two passage openings 214 which are closed off in the closed position, which is shown in FIG. 20, by a respective venting flap 216. In the example shown, the venting flaps 216 are again each connected integrally to two pivot arms 220 which are received in corresponding pivot receptacles on the inner side of the housing 210 in a latching manner such that, in the case of this exemplary embodiment too, the venting flaps 216 can be pivoted in the manner of a butterfly between the closed position shown in FIG. 20 and an open position (not shown) about pivot axes which are vertical in this example. In order to restore the venting flaps 216 from the open position into the closed position when the air pressure between vehicle interior and vehicle surroundings is equalized, two leg springs 232 are again provided in the example shown, which leg springs are twisted counter to their prestress during opening of the venting flaps 216 and accordingly prestress the venting flaps 216 back into the closed position. The function in this regard corresponds to the function explained with respect to the exemplary embodiment according to FIGS. 10 to 19.

Figure 22:
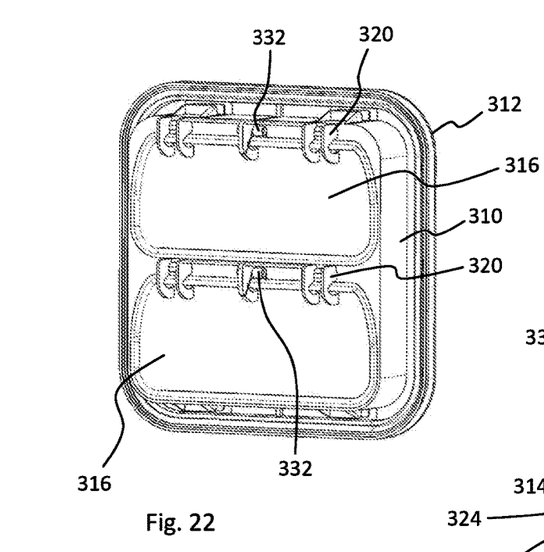
FIG. 22 shows a further exemplary embodiment of a venting valve according to the invention in a perspective view from the inside.
Figure 23:
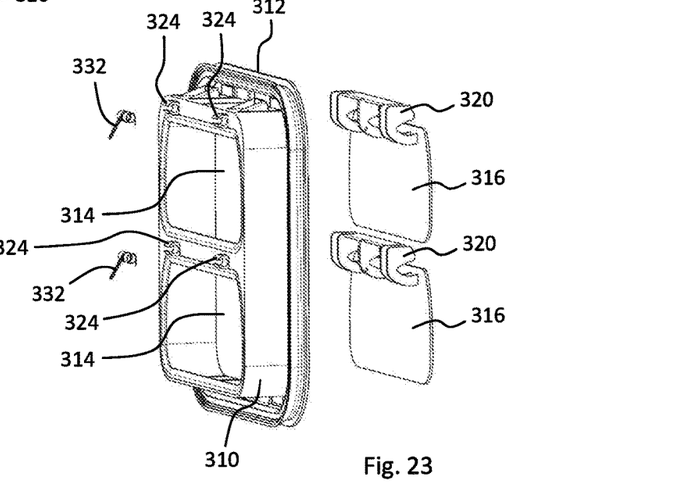
FIG. 23 shows an exploded illustration of the venting valve shown in FIG. 22.

FIGS. 22 and 23 show a further exemplary embodiment of a venting valve according to the invention which, in turn, substantially corresponds to the exemplary embodiment according to FIGS. 10 to 19 and according to FIGS. 20 and 21. A housing 310 with a housing projection 312 is again provided for mounting in a mounting opening of a vehicle. In the example shown, the housing 310 again defines two passage openings 314 which, in the closed position shown in FIG. 22, are closed off by a respective venting flap 316. In the example shown, each venting flap 316 is connected integrally to a pivot arm 320 which is in each case fastened in a latching manner by two pivot cylinders in in each case two corresponding pivot receptacles 324 on the inner side of the housing 310. Furthermore, in the exemplary embodiment according to FIGS. 22 and 23, two leg springs 332 are also provided which again prestress the venting flaps 316 into the closed position shown in FIG. 22, as has been explained above with reference to FIGS. 10 to 21.

Figure 24:
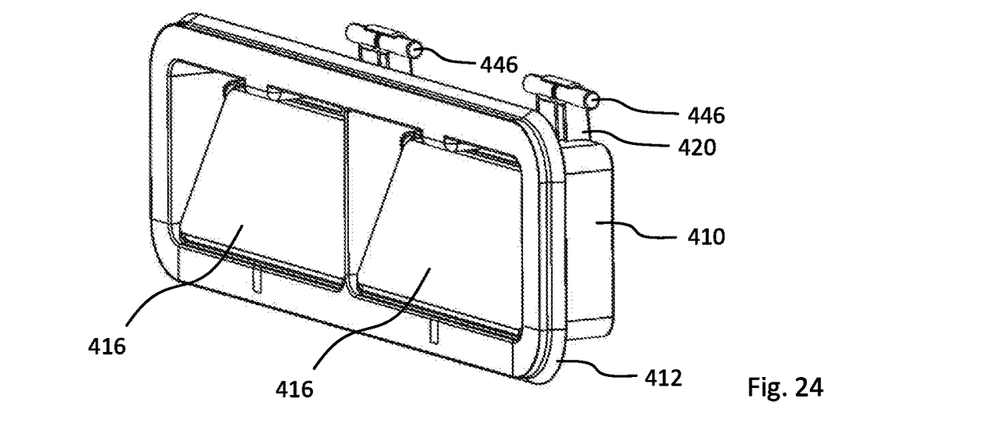
FIG. 24 shows a further exemplary embodiment of a venting valve according to the invention in a perspective view from the outside.
Figure 25:
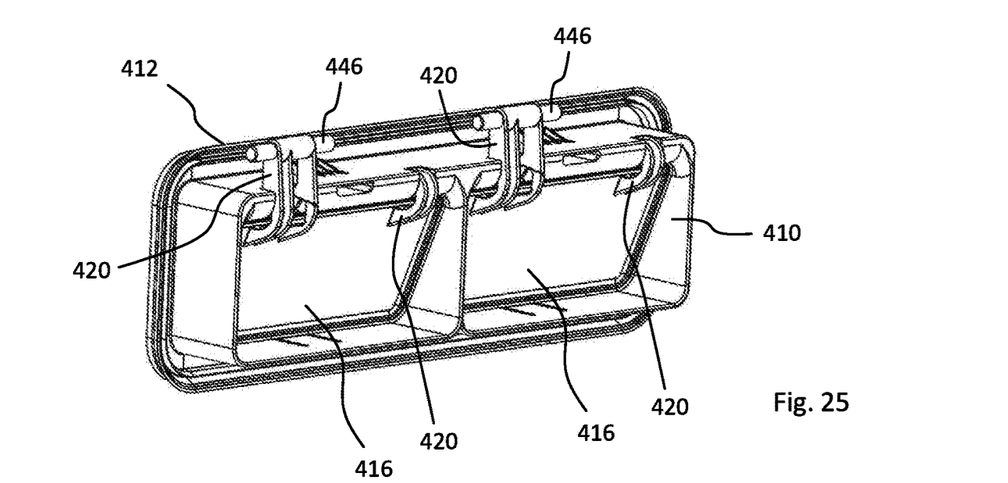
FIG. 25 shows the venting valve, which is shown in FIG. 24, in a perspective view from the inside.
Figure 26:
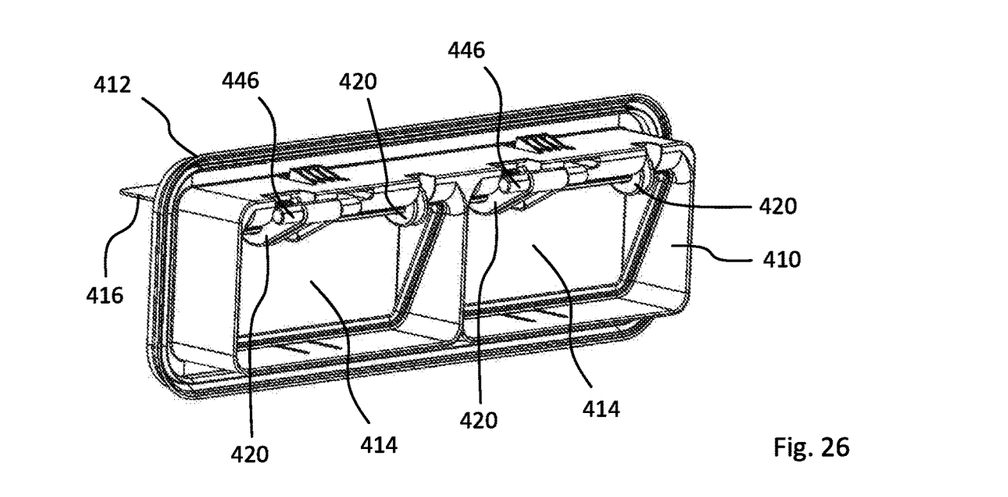
FIG. 26 shows the illustration from FIG. 25 with venting flaps open.
Figure 27:
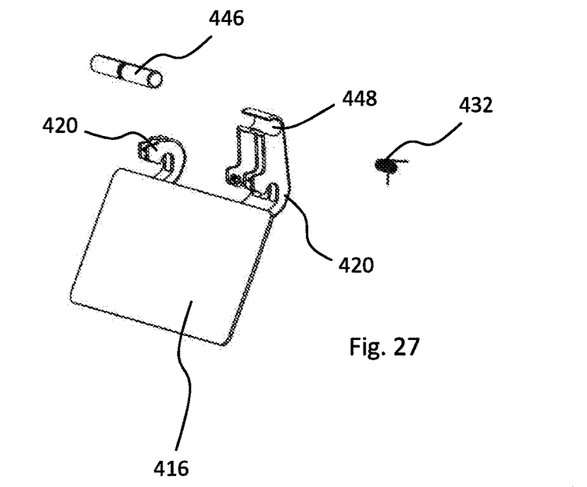
FIG. 27 shows an exploded illustration of part of the venting valve shown in FIGS. 24 to 26.

A further exemplary embodiment of a venting valve according to the invention will be explained with reference to FIGS. 24 to 28. This venting valve again has a housing 410 which can again be fastened with a housing projection 412 (sealing frame), for example in a body opening of a vehicle, such as a passenger vehicle or truck. In the example shown, the housing 410 again forms two passage openings 414 which, in the operating state shown in FIGS. 24 and 25, are closed off by a respective venting flap 416. The venting flaps 416 are again mounted on the housing 410 so as to be pivotable between the closed position shown in FIGS. 24 and 25 and the open position shown in FIG. 26.

Figures 28, 29:
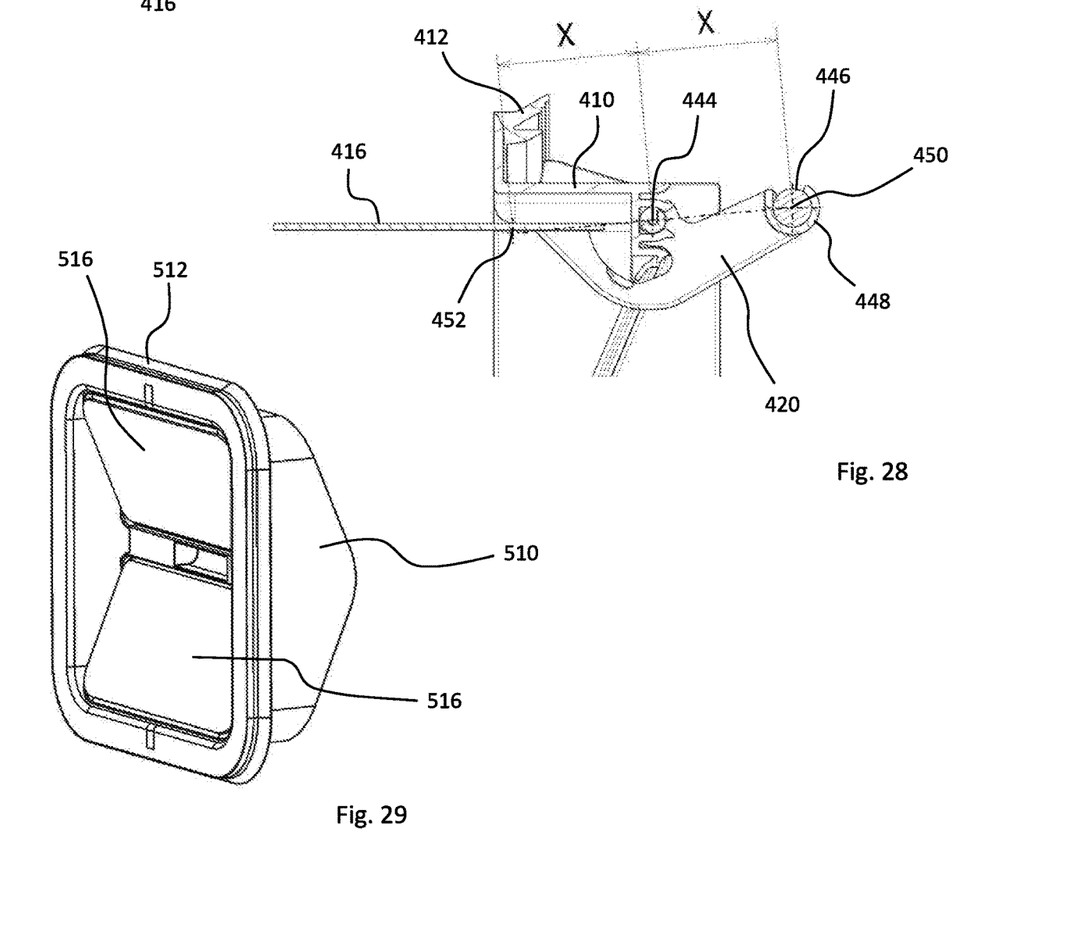
FIG. 28 shows a partial sectional view of the venting valve shown in FIGS. 24 to 27.
FIG. 29 shows a further exemplary embodiment of a venting valve according to the invention in a perspective view from the outside.

The venting flaps 416 are mounted pivotably on the housing 410 by means of in each case two pivot arms 420. In FIG. 28, the pivot axis is shown at reference sign 444. The pivot mounting of the pivot arms 420 on the housing 410 can in principle take place in the manner explained above for the other exemplary embodiments. It can be seen in turn from FIGS. 24 to 28 that the pivot bearing is arranged on an inner side of the housing 410, which inner side, in the assembled state, faces the interior of the vehicle.

In the exemplary embodiment according to FIGS. 24 to 28, each venting flap 416 is in each case assigned a counterweight 446 which is received in a latching manner in a detent receptacle 448 of one of the pivot arms 420. In addition, in the example shown, each venting flap 416 is assigned a leg spring 432 which is fastened to the pivot arm 420, which receives the counterweight 446, in such a manner that, when the respective venting flap 416 pivots into the open position, the leg spring is twisted in relation to its inoperative form and a spring prestress is thus built up which, after the pressure has been equalized, pivots the venting flap 416 back into the closed position. The arrangement of the counterweight 446 here is such that a common center of gravity of the venting flap 416 assigned to said counterweight 446 and the counterweight 446 lies in the pivot axis 444, and therefore the counterweight 446 and the venting flap 416 have identical torques. For example, if the counterweight 446 and the venting flap 416 have the same weight, this can be achieved in a simple manner by the center of gravity of the counterweight 446 and the center of gravity of the venting flap 416 having the same spacing from the pivot axis 444, in a manner lying opposite each other, and being arranged on a straight line running through the pivot axis 444, as is shown in FIG. 28. The center of gravity of the counterweight 446 is shown there at reference sign 450. The center of gravity of the venting flap 416 is shown at reference sign 452, and the spacings of said centers of gravity from the pivot axis 444 are denoted by X.

Figure 30:
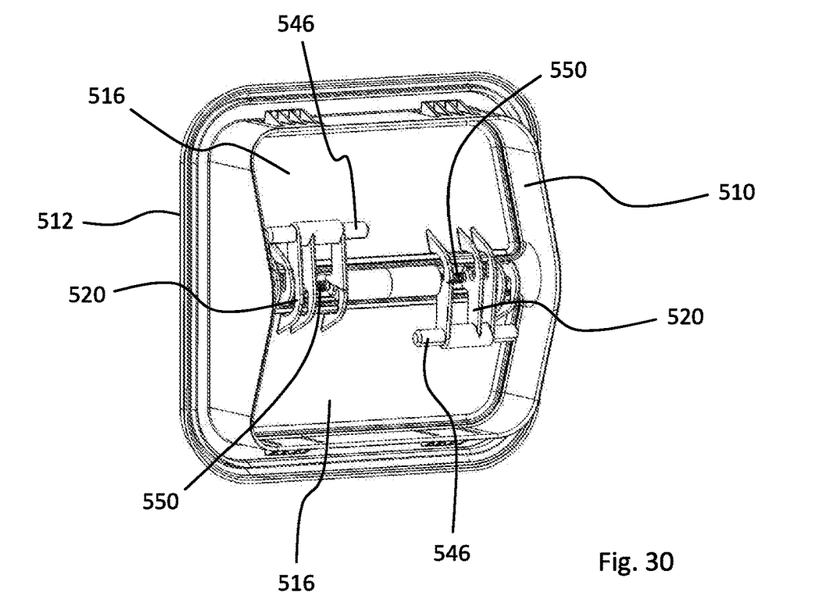
FIG. 30 shows the venting valve, which is shown in FIG. 29, in a perspective view from the inside.
Figure 31:
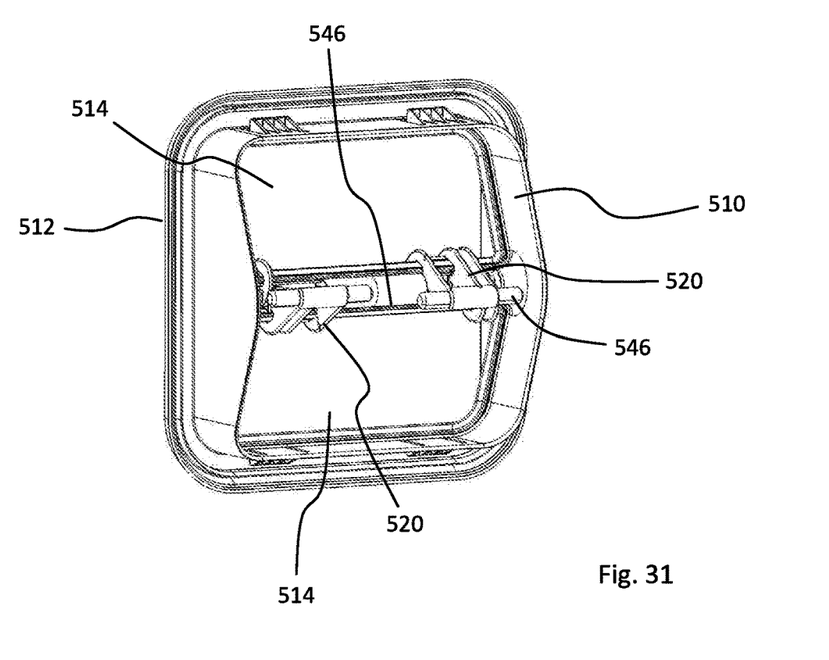
FIG. 31 shows the illustration from FIG. 30 with venting flaps open.

FIGS. 29 to 31 show a further exemplary embodiment of a venting valve according to the invention which very substantially corresponds to the exemplary embodiment according to FIGS. 24 to 28. This exemplary embodiment also has a housing 510 with a housing projection 512 (sealing frame) for fitting, for example, in a body opening of a vehicle, such as a passenger car or truck. The housing 510 again forms two passage openings 514 which, in the operating state shown in FIGS. 29 and 30, are closed off by a respective venting flap 516. The venting flaps 516 are in turn mounted on the housing 510, via a respective pivot arm 520, so as to be pivotable between the closed position shown in FIGS. 29 and 30 and the open position shown in FIG. 31. It is again immediately apparent from the figures that the pivot mounting is arranged on an inner side of the housing 510, which inner side, in the assembled state, faces the interior of the vehicle. A counterweight 546 is again arranged on each of the pivot arms 520. In addition, a leg spring 550 is again arranged on each of the pivot arms 520 and prestresses the venting flaps 516, after the pressure has been equalized, from the open position into the closed position, as has been explained with respect to the exemplary embodiment according to FIGS. 24 to 28. As in the exemplary embodiment according to FIGS. 24 to 28, the counterweight 546 is again in each case arranged in such a manner that a common center of gravity of the respective venting flap 516 and of the counterweight 546 lies in the pivot axis of the respective venting flap 516.

The exemplary embodiment according to FIGS. 29 to 31 differs from the exemplary embodiment according to FIGS. 24 to 28 substantially only by the arrangement and opening direction of the venting flaps 516. In the exemplary embodiment according to FIGS. 29 to 31, the venting flaps 516 open in an opposed manner like a butterfly.

Various exemplary embodiments of the invention have been explained with reference to the figures. It goes without saying that various features of the exemplary embodiments can be combined with one another in a basically free manner. For example, in the case of the exemplary embodiment according to FIGS. 1 to 9, the pivot arms 20 could also be connected integrally to the venting flaps 16. It would also be possible in the case of the exemplary embodiments according to FIGS. 10 to 31 for the pivot arms 120, 220, 320, 420, 520 to be formed separately from the venting flaps 116, 216, 316, 416, 516 and to be connected thereto, for example, by means of a detent connection. Venting flaps formed separately from pivot arms could also be fastened to said pivot arms in another manner, for example by means of an adhesive connection, a (laser) welding connection or other connections. Furthermore, in the exemplary embodiments according to FIGS. 10 to 31, the pivot arms could also have aerodynamically active portions, such as the V-shaped portions 30. Furthermore, the aerodynamically active portions 30 could also be omitted in the case of the exemplary embodiment according to FIGS. 1 to 9. Furthermore, it goes without saying that, instead of the in each case two venting flaps and two passage openings shown in the figures, fewer or more than two passage openings or venting flaps can also be provided. The arrangement of the pivot axes (vertically/horizontally) and the opening and closing directions of the venting flaps (in the direction of gravity/counter to the direction of gravity) can also be varied in a suitable manner in each case.

LIST OF REFERENCE SIGNS

10 Housing
12 Housing projection
14 Passage opening
16 Venting flap
18 Air stream
20 Pivot arm
22 Pivot pin
24 Pivot receptacle
26 Detent receptacle
28 Detent projection
30 V-shaped portion
110 Housing
112 Housing portion
114 Passage opening
116 Venting flap
120 Pivot arm
122 Pivot cylinder
124 Pivot receptacle
132 Double leg spring
134 Cylindrical projection
136 Receptacle
138 Bearing portion
140 Stop surface
142 Stop surface
210 Housing
212 Housing portion
214 Passage opening
216 Venting flap
220 Pivot arm
232 Leg spring
310 Housing
312 Housing portion
314 Passage opening
316 Venting flap
320 Pivot arm
324 Pivot receptacle
332 Leg spring
410 Housing
412 Housing projection
414 Passage openings
416 Venting flaps
420 Pivot arms
432 Leg spring
444 Pivot axis
446 Counterweight
448 Detent receptacle
450 Center of gravity of the counterweight
452 Center of gravity of the venting flap
510 Housing
512 Housing projection
514 Passage openings
516 Venting flap
520 Pivot arms
546 Counterweight
550 Leg spring

The invention claimed is:

1. A venting valve for venting the interior of a vehicle, comprising a housing having at least one passage opening, and comprising at least one venting flap which is mounted on the housing by a pivot mounting so as to be pivotable between a closed position and an open position, wherein, in the closed position, the at least one venting flap closes off the at least one passage opening and, in the open position, opens up the at least one passage opening for an air stream coming from the interior of the vehicle to the outside, wherein the pivot mounting is arranged on an inner side of the housing, which inner side, in the assembled state, faces the interior of the vehicle;

wherein the pivot mounting comprises at least one pivot arm which is connected to the at least one venting flap and is pivotably articulated on at least one pivot bearing arranged on the inner side of the housing;

wherein the at least one pivot arm includes pivot tab extending from a central portion of the at least one pivot arm, the pivot tab carrying at least one pivot pin that seats into a pivot receptacle mounted on the housing, wherein the at least one pivot arm is configured such that, in the closed position of the at least one venting flap, the at least one pivot arm guides, in a direction toward at least one venting flap, the air stream coming from the interior of the vehicle, and in that, in the open position, the at least one pivot arm guides, in a direction toward at least one passage opening of the housing, the air stream coming from the interior of the vehicle;

wherein the at least one pivot arm includes a first portion extending from a location of the pivot tab to the at least one venting flap and a second portion extending from the location of the pivot tab to a free end that is spaced away from the pivot bearing.

2. The venting valve as claimed in claim 1, wherein, at least in the open position of the at least one venting flap, the at least one pivot arm extends through the at least one passage opening of the housing.

3. The venting valve as claimed in claim 1, wherein, at least in the open position of the at least one venting flap, the at least one pivot arm abuts against at least one stop surface.

4. The venting valve as claimed in claim 1, wherein the at least one pivot arm is connected integrally to the at least one venting flap.

5. The venting valve as claimed in claim 1, wherein the at least one pivot arm is connected to the at least one venting flap by means of a detent connection.

6. The venting valve as claimed in claim 1, wherein the at least one venting flap consists of a softer material than the at least one pivot arm.

7. The venting valve as claimed in claim 1, wherein restoring means are provided for the pivoting back of the at least one venting flap from the open position into the closed position.

8. The venting valve as claimed in claim 7, wherein the restoring means comprise a counterweight for the gravity-induced pivoting back of the at least one venting flap into the closed position.

9. The venting valve as claimed in claim 8, wherein the counterweight is formed by a portion of the at least one pivot arm.

10. The venting valve as claimed in claim 9, wherein the restoring means comprise at least one spring for the spring-force- induced pivoting back of the at least one venting flap into the closed position.

11. The venting valve as claimed in claim 10, wherein the at least one venting flap is assigned at least one counterweight wherein the at least one counterweight is arranged in such a manner that a common center of gravity of the at least one venting flap and of the at least one counterweight assigned to the at least one venting flap lies in the pivot axis of the at least one venting flap.

12. A vehicle having a venting valve as claimed in claim 1 mounted thereon.

13. A venting valve for venting the interior of a vehicle, comprising:
- a housing having a first passage opening and a second passage opening, the first passage opening below the second passage opening;
- a first venting flap and a second venting flap, the first venting flap mounted on the housing by a first pivot mounting so as to be pivotable between a closed position and an open position, wherein, in the closed position, the first venting flap closes off the first passage opening and, in the open position, opens up the first passage opening for an air stream coming from the interior of the vehicle to the outside, the second venting flap mounted on the housing by a second pivot mounting so as to be pivotable between a closed position and an open position, wherein, in the closed position, the second venting flap closes off the second passage opening and, in the open position, opens up the second passage opening for the air stream coming from the interior of the vehicle to the outside;
- wherein the first pivot mounting and the second pivot mounting are arranged on an inner side of the housing, which inner side, in the assembled state, faces the interior of the vehicle;
- wherein the first pivot mounting comprises a first pivot arm which is connected to the first venting flap and is pivotably articulated on at least one pivot bearing arranged on the inner side of the housing;
- wherein the first pivot arm is configured such that, in the closed position of the first venting flap, the first pivot arm guides, in a direction toward the first venting flap, the air stream coming from the interior of the vehicle, and in that, in the open position, the first pivot arm guides, in a direction toward the second passage opening of the housing, the air stream coming from the interior of the vehicle;
- wherein the at least one pivot arm includes a first portion extending from the pivot bearing to the at least one venting flap and a second portion extending from the pivot bearing to a free end that is spaced away from the pivot bearing,
- wherein the second portion is V-shaped with a free end segment, wherein, when the at least one venting flap is in the closed position, an end edge of the free end segment faces toward and is located adjacent to a portion of the housing that defines an upper side of the first passage opening and a lower side of the second passage opening, and the free end segment extends parallel to the portion of the housing that defines an upper side of the first passage opening and a lower side of the second passage opening, wherein, when the at least one venting flap is in the open position, the free end segment is angularly offset from the main flow direction and oriented to guide, in the direction toward the second passage opening of the housing, the air stream coming from the interior of the vehicle.

\* \* \* \* \*